US012237557B2

(12) United States Patent
Huang

(10) Patent No.: US 12,237,557 B2
(45) Date of Patent: Feb. 25, 2025

(54) POWER DIVIDER AND REGULATING METHOD THEREFOR COMPRISING M POWER DIVISION UNITS CASCADED INTO N LEVELS AND HAVING CONJUGATE-MATCHING OF IMPEDANCES

(71) Applicant: ZTE CORPORATION, Guangdong (CN)

(72) Inventor: Bei Huang, Guangdong (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 506 days.

(21) Appl. No.: 17/624,339

(22) PCT Filed: Sep. 28, 2020

(86) PCT No.: PCT/CN2020/118315
§ 371 (c)(1),
(2) Date: Dec. 31, 2021

(87) PCT Pub. No.: WO2021/063302
PCT Pub. Date: Apr. 8, 2021

(65) Prior Publication Data
US 2022/0320703 A1 Oct. 6, 2022

(30) Foreign Application Priority Data
Sep. 30, 2019 (CN) ......................... 201910944533.8

(51) Int. Cl.
*H01P 5/12* (2006.01)
*H01P 5/19* (2006.01)

(52) U.S. Cl.
CPC . *H01P 5/12* (2013.01); *H01P 5/19* (2013.01)

(58) Field of Classification Search
CPC ........................................................ H01P 5/12
(Continued)

(56) References Cited

U.S. PATENT DOCUMENTS 5,162,756 A * 11/1992 Taniguchi et al. ........ H01P 5/12 333/127
7,970,037 B2 6/2011 Hauer et al.

FOREIGN PATENT DOCUMENTS

CN 103050756 A 4/2013
CN 104319449 A 1/2015
(Continued)

OTHER PUBLICATIONS

Sanechips Technology Co., Ltd., International Search Report, PCT/CN2020/118315, Dec. 9, 2020, 5 pgs.

*Primary Examiner* — Benny T Lee
(74) *Attorney, Agent, or Firm* — CANTOR COLBURN LLP

(57) ABSTRACT

A power divider, a regulation method, a power allocation method, a storage medium, and an electronic device are disclosed. The power divider includes M power division units. The M power division units are cascade connected to form a cascade structure of N levels, each of the power division units includes one input port and two output ports. Each of power division units in a Kth level in the cascade structure satisfies relationships of: input impedance of a power division unit in the Kth level conjugate-matches output impedance of a unit connected to an input port of the power division unit in the Kth level, and output impedance of the power division unit in the Kth level conjugate-matches load impedance of the power division unit in the Kth level, where N, K, and M are positive integers greater than or equal to 1.

8 Claims, 5 Drawing Sheets

(58) Field of Classification Search
USPC .......................................................... 333/125
See application file for complete search history.

(56) References Cited

FOREIGN PATENT DOCUMENTS

| | | | |
|---|---|---|---|
| CN | 204391236 | U | 6/2015 |
| CN | 105226365 | A | 1/2016 |
| CN | 105353465 | A | 2/2016 |
| CN | 106532216 | A | 3/2017 |
| CN | 108011168 | A | 5/2018 |
| CN | 207572511 | U | 7/2018 |
| CN | 108376820 | A | 8/2018 |
| CN | 207925640 | U | 9/2018 |
| EP | 0997965 | A1 | 5/2000 |
| JP | 60247303 | A | 12/1985 |
| JP | 9321509 | A | 12/1997 |
| JP | 2012178754 | A | 9/2012 |
| JP | 2014138381 | A | 7/2014 |

* cited by examiner

POWER DIVIDER AND REGULATING METHOD THEREFOR COMPRISING M POWER DIVISION UNITS CASCADED INTO N LEVELS AND HAVING CONJUGATE-MATCHING OF IMPEDANCES

CROSS REFERENCE TO RELATED APPLICATIONS

The present application is a United States National Stage Application filed under 35 U.S.C. § 371 of PCT Patent Application Serial No. PCT/CN2020/118315, filed Sep. 28, 2020, which claims priority to Chinese patent application No. 201910944533.8, filed on Sep. 30, 2019, each of which is incorporated by reference in its entirety.

TECHNICAL FIELD

The present disclosure relates to the field of communication technology, for example, to a power divider, a regulation method, a power allocation method, a storage medium and an electronic device.

BACKGROUND

With development of mobile communication, electronic countermeasure and satellite communication to achieve miniaturization, wide frequency band and higher working frequency band, requirements for frequency and bandwidth are also developed towards high frequency and wide frequency band. At present when the fifth generation mobile communication system (hereafter, "5G") technology is being rapidly developed, the millimeter wave band is widely studied for the millimeter wave band's characteristics of large bandwidth and high capacity. Due to high loss of high frequency signal during transmission, which affects communication quality, it is necessary to employ multi-channel phased array technology in which a power divider is essential. With demand for miniaturization of radio frequency device integration, power dividers in the form of microwave integrated circuits are being studied. It would be highly significant to design a miniaturized power divider since the performance of the whole system will be affected by the performance of the power divider.

The power divider is a microwave device which divides one path of input signals into two or more paths of output signals. The conventional power dividers perform equal division (3 dB), and there are also some power dividers that perform unequal division. The power dividers are usually classified, according to outputs thereof, into several types, for example, one-two (one input to two outputs) power divider, one-three (one input to three outputs) power divider and so on. The main technical parameters for the power dividers include power loss (including insertion loss, distribution loss and reflection loss), voltage standing wave ratio of each port, isolation between output ports, amplitude balance and phase balance, power capacity and bandwidth, etc.

The power divider may have a simplest structure of a T-junction. The T-junction power divider, simply having three ports, usually includes a lossless T-junction power divider and a resistive power divider. The lossless T-junction power divider can not be matched at all ports, and has no isolation between output ports. The resistive power divider can be matched at all ports, but has energy loss, and isolation between the output ports is poor. A Wilkinson power divider is widely used in the field of circuits, as the Wilkinson power divider not only achieves port matching, but also has less transmission loss, and further achieves better isolation between the output ports due to an isolation resistor employed in an output unit.

The conventional Wilkinson power divider is based on impedance transformation characteristic of one-quarter wavelength, and is a one-two power divider realizing input-output matching. Multiple one-two Wilkinson power dividers may be cascade connected to realize a one-$2^N$ power divider. In such a conventional design, a length of a microstrip line of at least one-quarter wavelength is required for one-two power dividers in each level, which not only increases the loss, but also occupies a large area and increases in cost, and is further disadvantageous for integration of chips. FIG. 1 is a schematic structural diagram of a one-two conventional Wilkinson power divider, As shown in FIG. 1, the one-two conventional Wilkinson power divider comprise Input Port, Output Port 1 and Output Port 2, and FIG. 2 is a schematic structural diagram of a one-$2^N$Wilkinson power divider. As shown in FIGS. 1 and 2, each of the input ports and the output ports is matched with characteristic impedance $Z_0$ of 50 ohms, and the line of one-quarter wavelength (i.e. λ/4) between an input and a subsequent output (e.g. port1, port2, . . . etc.) has characteristic impedance of $Z_1=\sqrt{2Z_0}$ and an isolation resistance of $2Z_0$. According to analysis of even-odd mode, the power divider is able to divide the signal into two halves. As shown in FIG. 2, the one-$2^N$ Wilkinson power divider comprise Output Port 1, Output Port 2, Output Port 3, Output Port 4, . . . , Output Port ($2^N$−3), Output Port ($2^N$−2), Output Port ($2^N$−1), Output Port ($2^N$), characteristic impedance $Z_0$, $Z_1$, $2Z_0$. The Wilkinson one-$2^N$ power divider has N levels (i.e. First Level, Second Level, . . . , Nth Level) of power dividers, in which a one-two power divider is provided in the first level, two one-two power dividers are provided in the second level, . . . , and $2^{(N-1)}$ one-two power dividers are provided in the Nth level. These identical $2^N$−1 power dividers are connected to form a one-2N power dividers, as shown in FIG. 2. However, the length of the signal line between the input and the output of each one-two power divider is fixedly one-quarter wavelength, such that the whole power divider has an increased area and causes a larger loss.

SUMMARY OF THE INVENTION

The present disclosure provides a power divider, a regulation method, a power allocation method, a storage medium, and an electronic device to at least solve a problem that a power divider has a large area due to a long signal line of the power divider.

Embodiments of the present disclosure provide a power divider including M power division units. The M power division units are cascade connected to form a cascade structure of N levels, each of the power division units includes one input port and two output ports. Each of power division units in a Kth level in the cascade structure satisfies relationships of: input impedance of a power division unit in the Kth level conjugate-matches output impedance of a unit connected to an input port of the power division unit in the Kth level, and output impedance of the power division unit in the Kth level conjugate-matches load impedance of the power division unit in the Kth level, where N, K, and M are positive integers greater than or equal to 1.

Embodiments of the present disclosure further provide a regulation method including regulating input impedance of a power division unit in a Kth level so that the input impedance of the power division unit in the Kth level conjugate-matches output impedance of a unit connected to an input port of the power division unit in the Kth level; and regulating output impedance of the power division unit in the Kth level so that the output impedance of the power division unit in the Kth level conjugate-matches load impedance of the power division unit in the Kth level. The power divider includes M power division units, the M power division units are cascade connected to form a cascade structure of N levels, each of the power division units includes one input port and two output ports, and N, K, and M are positive integers greater than or equal to 1.

Embodiments of the present disclosure further provide a power allocation method, including performing power allocation using the aforementioned power divider.

Embodiments of the present disclosure further provide a computer-readable storage medium storing a computer program, when executed by a processor, causing the processor to implement the aforementioned regulation method.

Embodiments of the present disclosure further provide an electronic device including a memory and a processor. The memory stores a computer program, and the processor is configured to execute the computer program to implement the aforementioned regulation method.

DETAILED DESCRIPTION OF THE INVENTION

The present disclosure will be described below with reference to the accompanying drawings, where like features are denoted by the same reference labels throughout the detail description of the drawings and in connection with embodiments.

The terms "first," "second," and the like herein are used to distinguish similar objects and are not necessarily used to describe a particular order or order of precedence.

Figure 1:
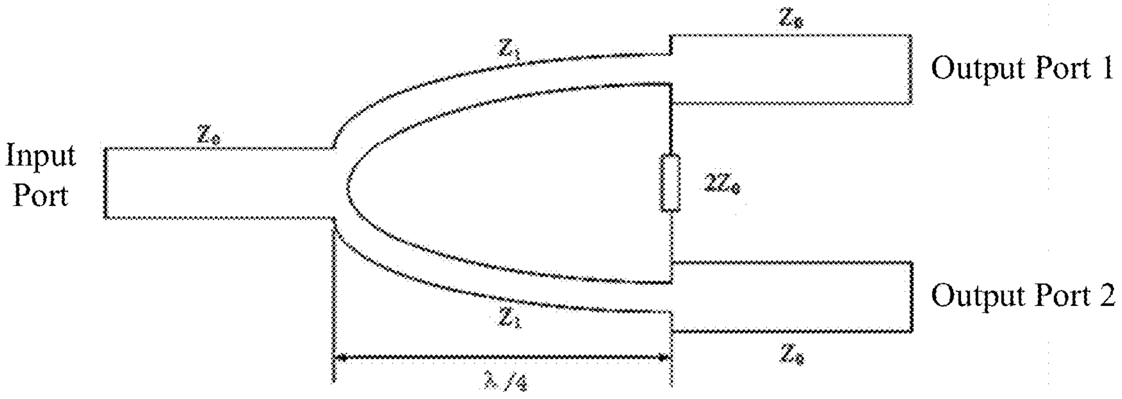
FIG. 1 (Prior Art)
FIG. 1 is a schematic structural diagram of a one-two conventional Wilkinson power divider.
Figure 2:
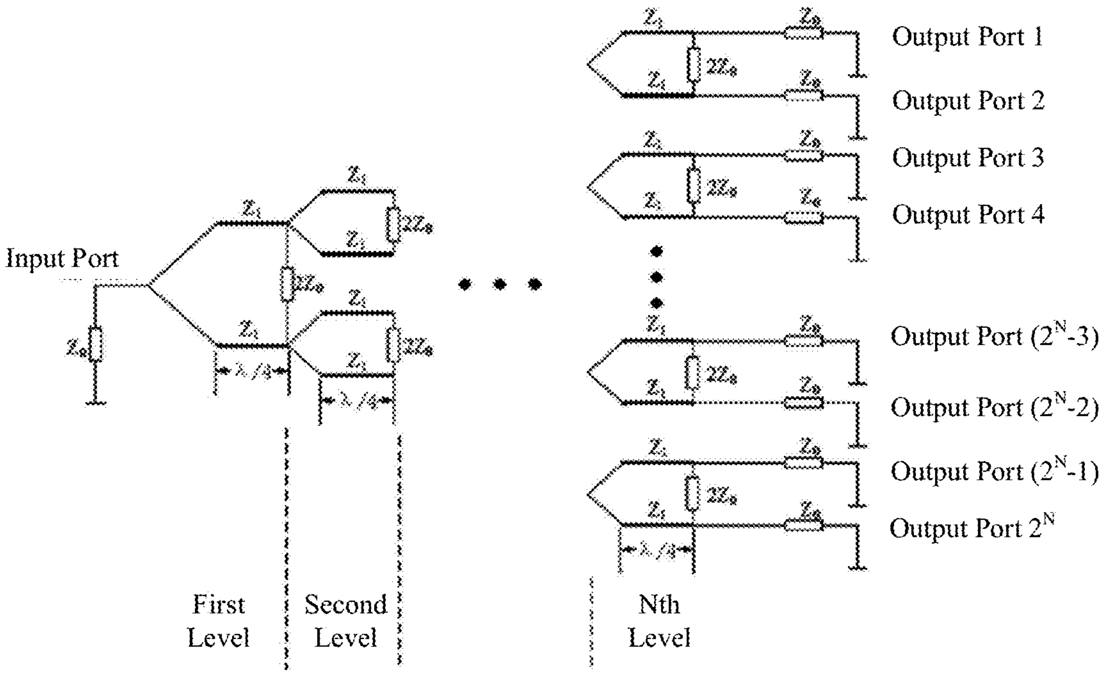
FIG. 2 (Prior Art)
FIG. 2*a* is a schematic structural diagram of a one-$2^N$ conventional Wilkinson power divider.
Figure 3:
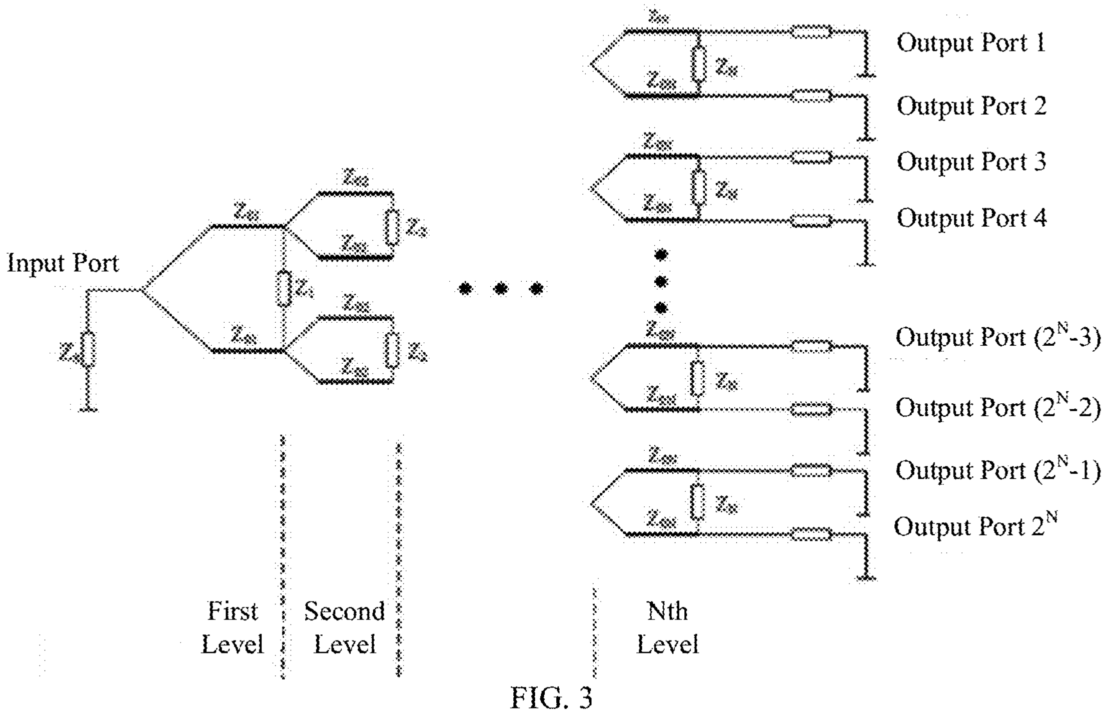
FIG. 3 is a schematic structural diagram of a power divider according to an embodiment of the present disclosure.

Embodiments of the present disclosure provide a power divider. FIG. 3 is a schematic structural diagram of a power divider according to an embodiment of the present disclosure. As shown in FIG. 3, the power divider includes M power division units, wherein the M power division units are cascade connected to form a cascade structure of N levels (i.e. First Level, Second Level, . . . , Nth Level), each of the power division units includes one input port and two output ports, and power division units in a Kth level in the cascade structure satisfies relationships of: input impedance of the Kth level of power division units conjugate-matches output impedance of a unit connected to an input port of the power division unit in the Kth level, and output impedance of the power division unit in the Kth level conjugate-matches load impedance of the power division unit in the Kth level, where N, K, and M are positive integers greater than or equal to 1. The power divider comprises Input Port, Output Port 1, Output Port 2, Output Port 3, Output Port 4, Output Port ($2^N$−3) Output Port ($2^N$−2), Output Port ($2^N$−1), Output Port ($2^N$)), characteristic resistance $Z_S$, $Z_{01}$, $Z_{02}$, . . . , $Z_{0N}$, $Z_1$, $Z_2$, . . . , $Z_N$.

According to the embodiments of the present disclosure, since the input impedance of power division units in each level conjugate-matches the output impedance of the unit connected to the input port of power division units in the respective level, and the output impedance of power division units in each level conjugate-matches the load impedance of power division units in the respective level. In this way, the inter-level impedance of the power divider is no longer a fixed impedance value, and may be a specified complex impedance, such that a length of power division units in each level is shortened, the problem of a larger area of the power divider due to a longer length of a signal line of the power divider is solved, an overall area of the power divider is reduced, and the loss of the power divider is reduced.

In an embodiment, in a case where N, M, and K are equal to 1, input impedance of a power division unit in a first level conjugate-matches target source impedance of the power divider, and output impedance of the power division unit in the first level conjugate-matches target load impedance of the power divider, where the target source impedance and the target load impedance of the power divider are predetermined. In a case where M is greater than or equal to 3, N is greater than or equal to 2, and K is equal to 1, the input impedance of the power division unit in the first level conjugate-matches the target source impedance of the power divider, and the output impedance of the power division unit in the first level conjugate-matches load impedance of the power division unit in the first level. In a case where M is greater than or equal to 3, N is greater than or equal to 2, and K is greater than or equal to 2 and less than N, input impedance of the power division unit in the Kth level conjugate-matches output impedance of a power division unit in a (K−1)th level, and output impedance of the power division unit in the Kth level conjugate-matches load impedance of the power division unit in the Kth level, where K is a positive integer in a range of 2 to N−1. In a case where M is greater than or equal to 3, N is greater than or equal to 2, and K is equal to N, the input impedance of the power division unit in the Kth level conjugate-matches the output impedance of the power division unit in the (K−1)th level, and the output impedance of the power division unit in the Kth level conjugate-matches the target load impedance of the power divider.

In an embodiment, the power divider further includes an impedance isolation unit. The impedance isolation unit is connected between the two output ports of each power division unit. The impedance isolation unit is configured to regulate output impedance of the power division unit so that the output impedance of the power division unit conjugate-matches the load impedance of the power division unit.

In an embodiment, the impedance isolation unit includes a resistor and a capacitor connected in parallel.

In an embodiment, in a case where M is greater than or equal to 3 and N is greater than or equal to 2, input impedance and/or output impedance corresponding to all or some of intermediate ports in the power divider are not equal to the target source impedance or the target load impedance of the power divider, where the intermediate ports are input ports or output ports in the power divider between a power divider input port and a power divider output port.

When the power divider includes two or more levels of power division units, the input impedance or the output impedance of some or all of the intermediate ports may not be equal to the target source impedance or the target load impedance of the power divider, where the intermediate ports are input ports or output ports in the power divider between the power divider input port and the power divider output port. For example, the intermediate ports include all ports connected between the output ports of the power division units in the first level of the power divider and the input ports of the power division units in the last level of the power divider, and further includes the output ports of the power division unit in the first level and the input ports of the power division units in the last level.

Figure 4:
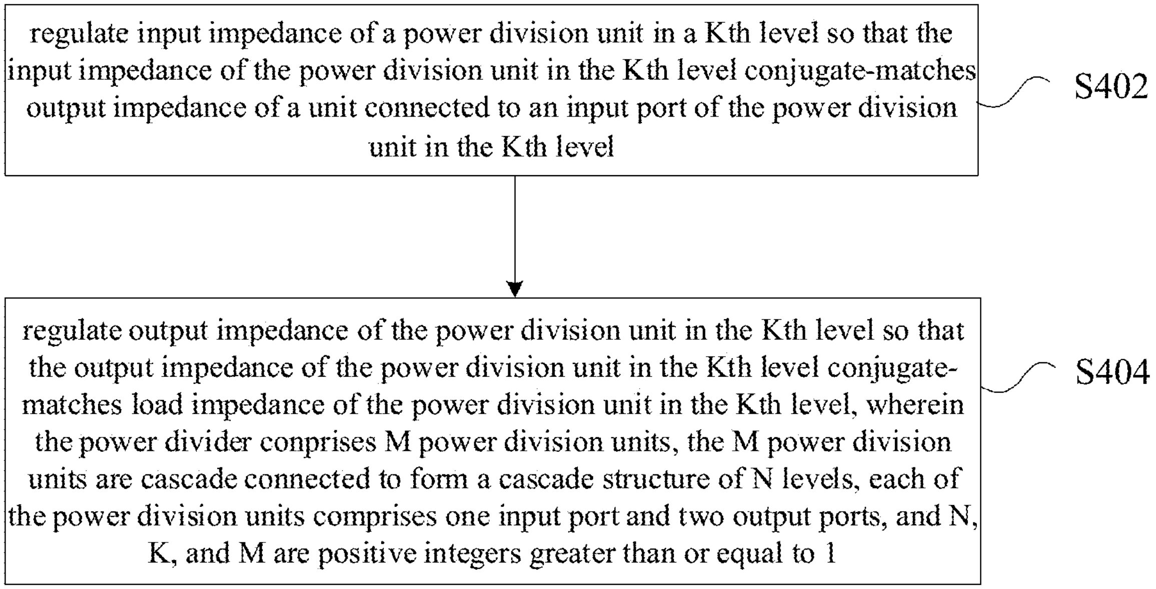
FIG. 4 is a flowchart of a regulation method according to an embodiment of the present disclosure.

Embodiments of the present disclosure further provide a regulation method applicable to a power divider, for example, the power divider described in the above embodiments. FIG. 4 is a flowchart of a regulation method according to an embodiment of the present disclosure. As shown in FIG. 4, the regulation method includes steps as follows.

In S402, input impedance of a power division unit in a Kth level is regulated so that the input impedance of the power division unit in the Kth level conjugate-matches output impedance of a unit connected to an input port of the power division unit in the Kth level.

In S404, output impedance of the power division unit in the Kth level is regulated so that the output impedance of the power division unit in the Kth level conjugate-matches load impedance of the power division unit in the Kth level. Herein the power divider includes M power division units, the M power division units are cascade connected to form a cascade structure of N levels, and each of the power division units includes one input port and two output ports, where N, K, and M are positive integers greater than or equal to 1.

According to the aforementioned steps, since the input impedance of power division units in each level conjugate-matches the output impedance of the unit connected to the input port of power division units in the respective level, and the output impedance of power division units in each level conjugate-matches the load impedance of power division units in the respective level. In this way, the inter-level impedance of the power divider is no longer fixed impedance value, and may be specified complex impedance, such that a length of power division units in each level is shortened, the problem of a larger area of the power divider due to a longer length of a signal line of the power divider is solved, an overall area of the power divider is reduced, and the loss of the power divider is reduced.

In an embodiment, the steps of regulating the input impedance of the power division unit in the Kth level so that the input impedance of the power division unit in the Kth level conjugate-matches the output impedance of the unit connected to the input port of the power division unit in the Kth level and regulating the output impedance of the power division unit in the Kth level so that the output impedance of the power division unit in the Kth level conjugate-matches the load impedance of the power division unit in the Kth level include steps as follows.

In a case where N, M, and K are equal to 1, input impedance of a power division unit in a first level is regulated to conjugate-match the target source impedance of the power divider, and output impedance of the power division unit in the first level is regulated to conjugate-match the target load impedance of the power divider, where the target source impedance and the target load impedance of the power divider are pre-determined. In a case where M is greater than or equal to 3, N is greater than or equal to 2, and K is equal to 1, the input impedance of the power division unit in the first level is regulated to conjugate-match the target source impedance of the power divider, and the output impedance of the power division unit in the first level is regulated to conjugate-match the load impedance of the power division unit in the first level. In a case where M is greater than or equal to 3, N is greater than or equal to 2, and K is greater than or equal to 2 and less than N, the input impedance of the power division unit in the Kth level is regulated to conjugate-match output impedance of a power division unit in a (K−1)th level, and output impedance of the power division unit in the Kth level is regulated to conjugate-match load impedance of the power division unit in the Kth level, where K is a positive integer in a range of 2 to N−1. In a case where M is greater than or equal to 3, N is greater than or equal to 2, and K is equal to N, the input impedance of the power division unit in the Kth level is regulated to conjugate-match the output impedance of the power division unit in the (K−1)th level, and the output impedance of the power division unit in the Kth level is regulated to conjugate-match the target load impedance of the power divider.

In an embodiment, the output impedance of the power division unit in the Kth level is regulated by: regulating a characteristic impedance and/or a length of microstrip line of the power division unit, and/or regulating output impedance of the power division unit by an impedance isolation unit connected between the two output ports of the power division unit.

In an embodiment, in a case where M is greater than or equal to 3 and N is greater than or equal to 2, input impedance and/or output impedance corresponding to all or some of intermediate ports in the power divider after regulation are not equal to the target source impedance or the target load impedance of the power divider, where the intermediate ports are input ports or output ports in the power divider between a power divider input port and a power divider output port.

Embodiments of the present disclosure further provide a power allocation method, including performing power allocation using the power divider as described in any of the above embodiments.

The embodiment of the present disclosure provides a method for configuring a miniaturized power divider, through which a power divider having an area reduced to at least one third of an original area and a reduced transmission loss can be obtained.

Figure 5:
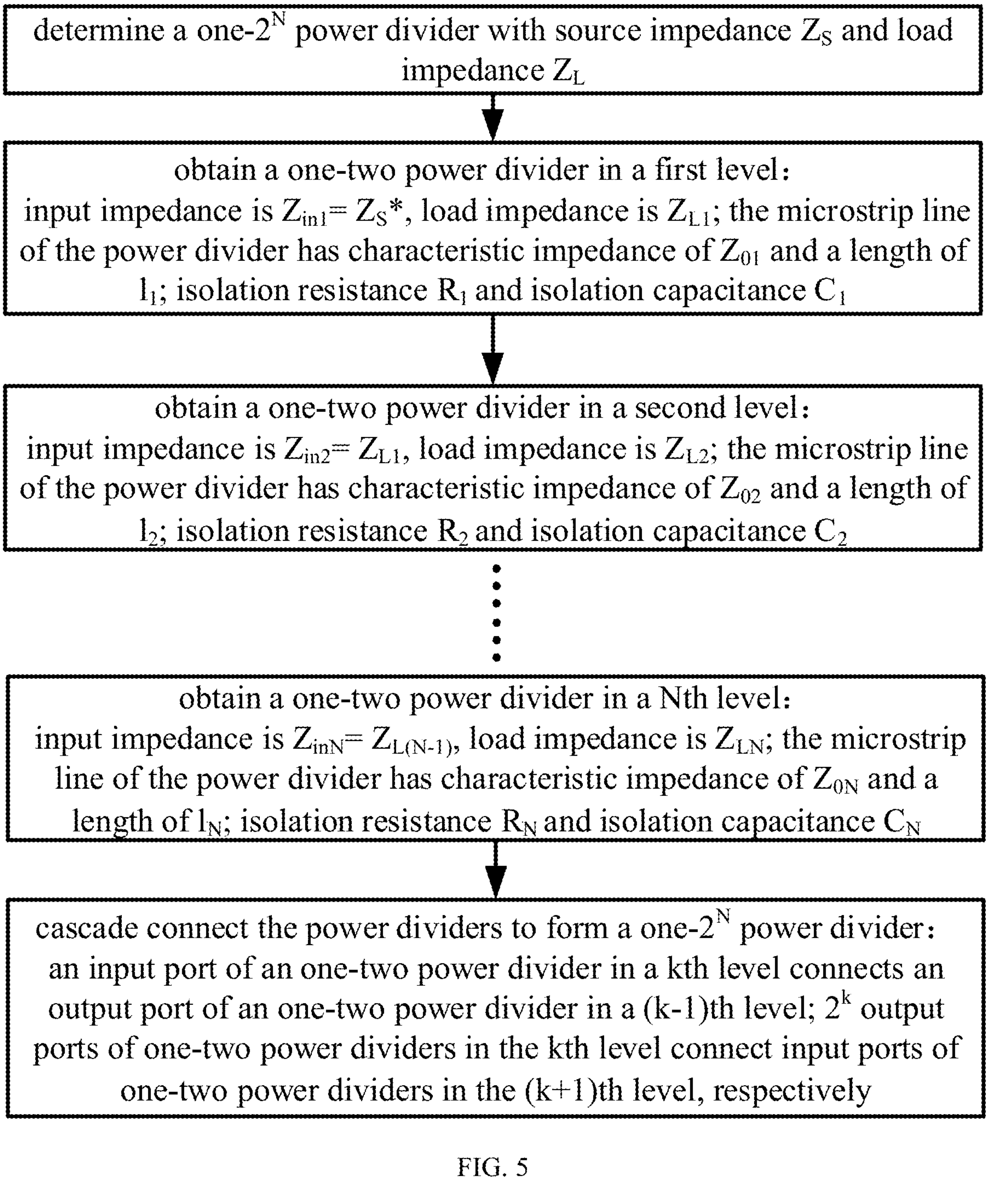
FIG. 5 is a schematic flowchart of implementing a miniaturized power divider according to an embodiment of the present disclosure.

FIG. 5 is a schematic flowchart of implementing a miniaturized power divider according to an embodiment of the present disclosure. As shown in FIG. 5, the method for configuring a miniaturized power divider according to the embodiment of the present disclosure includes steps as follows.

In a first step, it is determined that a one-$2^N$ power divider with source impedance $Z_S$ and load impedance $Z_L$ is required, for example, target source impedance and target load impedance of the power divider are pre-determined so that input impedance and output impedance of the power divider conjugate-match the source impedance and the load impedance.

In a second step, one-two power divider with input impedance of $Z_{in1}$ and output impedance matching load impedance of $Z_{L1}$ is obtained.

According to the embodiment of the present disclosure, the input port of the power divider matches the signal source impedance $Z_S$, the input impedance is $Z_{in1}=Z_S^*$, and the load impedance of the one-two power divider in the first level is $Z_{L1}$. The microstrip line used in the power divider has characteristic impedance of $Z_{01}$ and a length of $l_1$.

The output impedance and the load impedance of the one-two power divider in the first level conjugate-match each other to obtain good transmission characteristics. An impedance isolation unit is connected between two output ports of the one-two power divider in the first level, and the impedance isolation unit $Z_1$ may be formed by a resistor $R_1$ and a capacitor $C_1$ connected in parallel. The resistor $R_1$ and the capacitor $C_1$ not only serve to improve isolation, but also regulate the output impedance to conjugate-match the load impedance.

In a third step, one-two power dividers in a second level with input impedance of $Z_{in2}$ and output impedance matching load impedance of $Z_{L2}$ are obtained and then cascade connected with the power divider obtained in the second step to obtain a one-four power divider.

According to the embodiment of the present disclosure, the input ports of the one-two power dividers in the second level match the output impedance $Z_{L1}^*$ of the one-two power divider in the first level, and the input impedance is $Z_{in2}=Z_{L1}$. The microstrip line used in the power divider has characteristic impedance of $Z_{02}$ and a length of $l_2$.

The output impedance and the load impedance of the one-two power dividers in the second level conjugate-match each other to obtain good transmission characteristics. An impedance isolation unit is connected between two output ports of the one-two power divider in the second level, and the impedance isolation unit $Z_2$ may be formed by a resistor $R_2$ and a capacitor $C_2$ connected in parallel. The resistor $R_2$ and the capacitor $C_2$ not only serve to improve isolation, but also regulate the output impedance to conjugate-match the load impedance.

One-two power dividers with input impedance of $Z_{ink}$ and output impedance matching load impedance of $Z_{Lk}$ are obtained and then cascade connected with the power divider obtained in the third step to obtain a one-$2^k$ power divider, where k=2, 3, . . . , N−1.

According to the embodiment of the present disclosure, the input ports of the one-two power dividers in the kth level match the output impedance $Z_{L(k-1)}^*$ of the one-two power dividers in the (k−1)th level, and the input impedance is $Z_{ink}=Z_{L(k-1)}$. The load impedance of the one-two power dividers in the kth level is $Z_L$k. The relationship between $Z_{ink}$ and $Z_{Lk}$ is defined by:

$$Z_{ink} = \frac{1}{2} \cdot Z_{0k} \frac{Z_{Lk} + jZ_{0k} \tan(\beta l_k)}{Z_{0k} + jZ_{Lk} \tan(\beta l_k)},$$

where $Z_{0k}$ is characteristic impedance of the one-two power dividers in the kth level, $l_k$ is a length of the one-two power dividers in the kth level, $Z_L$k is load impedance of one-two power dividers in the kth level, $Z_{ink}$ is input impedance of the one-two power dividers in the kth level, and $\beta=2\pi/\lambda$, where $\lambda$ is a wavelength.

The output impedance and the load impedance of the one-two power dividers in the kth level conjugate-match each other to obtain good transmission characteristics. An impedance isolation unit is connected between two output ports of the one-two power divider in the kth level, and the impedance isolation unit $Z_k$ may be formed by a resistor $R_k$ and a capacitor $C_k$ connected in parallel. The resistor $R_k$ and the capacitor $C_k$ not only serve to improve isolation, but also regulate the output impedance to conjugate-match the load impedance.

In a fourth step, one-two power dividers in a Nth level with input impedance of $Z_{inN}$ and output impedance matching load impedance of $Z_{LN}$ are obtained and then cascade connected with the power divider obtained in the previous step to obtain a one-2N power divider.

According to the embodiment of the present disclosure, the input ports of the one-two power dividers in the Nth level match the output impedance $Z_{L(N-1)}^*$ of the one-two power dividers in the (N−1)th level, and the input impedance of the input ports of the one-two power dividers in the Nth level is $Z_{inN}=Z_{L(N-1)}$. The load impedance of the one-two power dividers in the Nth level is $Z_{LN}=Z_L$. The microstrip line used in the power divider has characteristic impedance of $Z_{0N}$ and a length of $l_N$.

The output impedance and the load impedance of the one-two power dividers in the Nth level conjugate-match each other to obtain good transmission characteristics. An impedance isolation unit is connected between two output ports of the one-two power divider in the Nth level, and the impedance isolation unit $Z_N$ may be formed by a resistor $R_N$ and a capacitor $C_N$ connected in parallel. The resistor $R_N$ and the capacitor $C_N$ not only serve to improve isolation, but also regulate the output impedance to conjugate-match the load impedance.

In a fifth step, the above power dividers are cascade connected to form a one-$2^N$ power divider.

According to the embodiment of the present disclosure, the one-$2^N$ power divider with N levels is formed by connecting $2^N-1$ power dividers. A one-two power divider is provided in the first level, two one-two power dividers are provided in the second level, four one-wo power dividers are provided in the third level, and so on, N−1 power dividers are provided in the N level.

An input port of the one-two power divider in the first level is connected to the source impedance, and a signal is transferred from the source impedance to the input port of the one-two power divider in the first level. Two output ports of the one-two power divider in the first level are respectively connected to input ports of two one-two power dividers in the second level, such that the signal is divided equally into four quarters by the power dividers in the first and second levels. By analogy, an input port of an one-two power divider in a kth level connects an output port of an one-two power divider in a (k−1)th level; $2^k$ output ports of one-two power dividers in the kth level connect input ports of one-two power dividers in the (k+1)th level. two output ports of a one-two power divider in the (N−1)th level are respectively connected to input ports of two one-two power dividers in the Nth level, such that the signal is divided equally into $2^N$ divisions by the power dividers in the first to Nth levels.

The conventional Wilkinson power divider uses power dividers with arm lengths of one-quarter wavelength to achieve matching of the output ports and the input ports to 50 ohm. In the embodiment of the present disclosure, with the flexible impedance matching, the multiple levels of one-two power dividers do not need to be limited to the one-quarter wavelength, thereby reducing the arm lengths of the power dividers and reducing the size of the power divider. This method is applicable and effective both in board-level circuits and in chip circuits. With the method according to the embodiment of the present disclosure, transmission loss, area and manufacturing cost are reduced.

Figure 6:
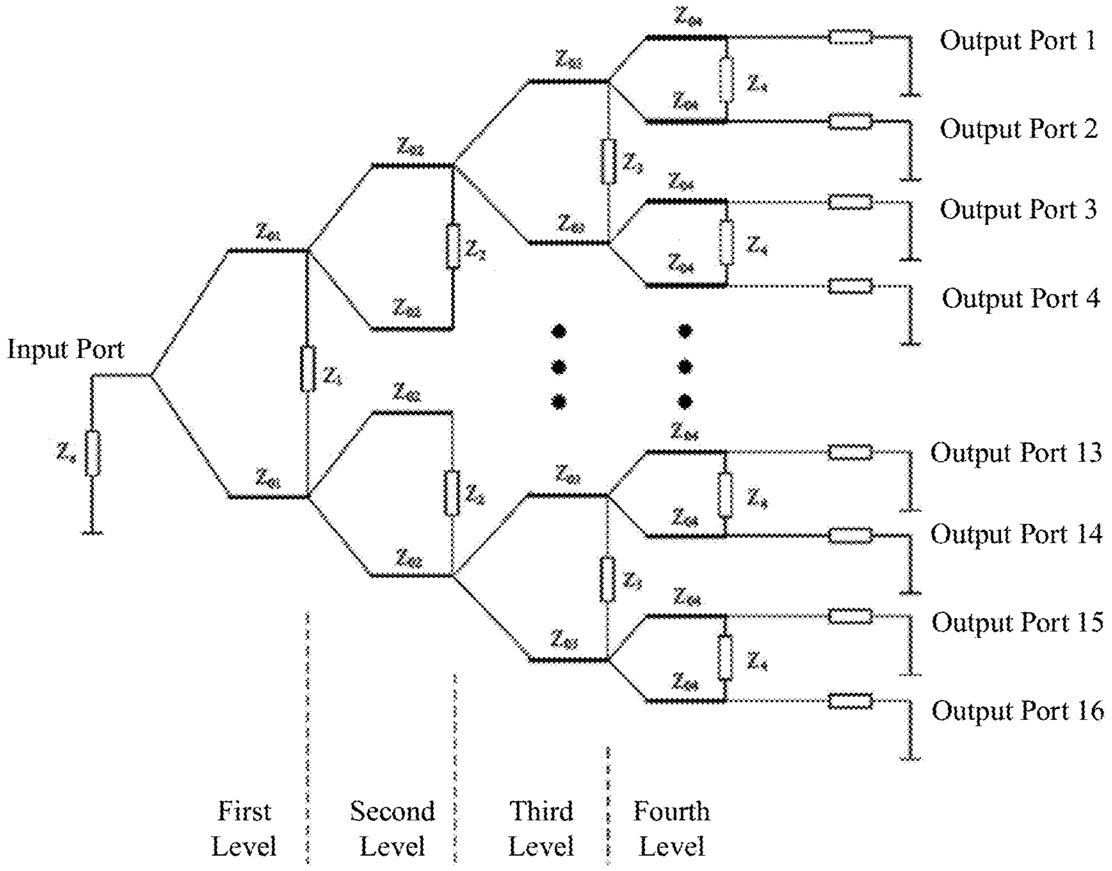
FIG. 6 is a schematic structural diagram of a one-sixteen power divider according to an embodiment of the present disclosure.

A one-sixteen power divider designed according to the theory discussed in the embodiments of the present disclosure effectively solves the problems of the conventional power divider. The overall structure of the power divider is shown in FIG. 6, which is a specific example of the one-$2^N$ power divider in FIG. 3. As shown in FIG. 6, the power divider comprises 4 levels (i.e. First Level, Second Level, Third Level, Fourth Level), further comprises Input Port, Output Port 1, Output Port 2, Output Port 3, Output Port 4, . . . , Output Port 13, Output Port 14, Output Port 15, Output Port 16, characteristic impedance $Z_S$, $Z_{01}$, $Z_{02}$, $Z_{03}$, $Z_{04}$, $Z_1$, $Z_2$, $Z_3$, $Z_4$.

In each level of one-two power dividers designed in the embodiment of the present disclosure, the relationship between input impedance $Z_{in}$ and load impedance $Z_L$ is defined by:

$$Z_{in} = \frac{1}{2} \cdot Z_0 \frac{Z_L + jZ_0 \tan(\beta l)}{Z_0 + jZ_L \tan(\beta l)}$$

where, $$\beta = 2\pi/\lambda_g,\ \lambda_g = \lambda\Big/\sqrt{\varepsilon_r}\,,$$

$\lambda_g$ is a wavelength of a signal in microstrip medium, $\lambda$ is a wavelength of the signal in vacuum, and $\varepsilon_r$ is a dielectric constant of the microstrip medium.

Different from the conventional power divider designs, the $Z_{in}$ and $Z_L$ herein are not constant to 50 ohm, but an intermediate impedance value that can be implemented. Similarly, the arm lengths l of the power dividers is not one-quarter wavelength, but a value determined by the input impedance and output impedance.

The power divider of the embodiment of the present disclosure includes microstrip lines, and a signal line is thick metal layer at a top layer, a bottom layer of metal serves as a ground plane, a working frequency band is 37 GHz to 40 GHz, the one-quarter wavelength is about 1200 m, and the input impedance and output impedance are 50 ohm.

In a one-two power divider in the first level of the one-sixteen power divider according to the embodiment of the present disclosure, input impedance needs to match 50 ohm, and output impedance does not need to match 50 ohm, so that a length of a microstrip line does not need to be a length of one-quarter wavelength. The characteristic impedance of the microstrip line is 50 ohm, the output impedance of the output ports is 56 ohm-j25 ohm, the length is 387 μm and is one third of one-quarter wavelength. Isolation between output ports is optimized by isolation resistance and capacitance.

In one-two power dividers in the second level of the one-sixteen power divider according to the embodiment of the present disclosure, input impedance is 56 ohm+j25 ohm that matches the power divider in the first level, and a microstrip line with characteristic impedance of 50 ohm is also used to realize dividing the power into two halves. The microstrip line has a length of 330 μm and is one third of one-quarter wavelength. The output impedance of the output port is 40 ohm-j40 ohm, and isolation between the output ports is optimized by the isolation resistance and capacitance.

In one-two power dividers in the third level of the one-sixteen power divider according to the embodiment of the present disclosure, input impedance is 40 ohm+j40 ohm that matches the power dividers in the second level, and a microstrip line with characteristic impedance of 50 ohm is also used to realize dividing the power into two halves. The microstrip line has a length of 290 m. The output impedance of the output port is 30 ohm-j42 ohm, and isolation between the output ports is optimized by the isolation resistance and capacitance.

In one-two power dividers in the fourth level of the one-sixteen power divider according to the embodiment of the present disclosure, input impedance is 30 ohm+j42 ohm that matches the power dividers in the third level, and output impedance needs to match 50 ohm. Isolation between the output ports is optimized by the isolation resistance and capacitance.

The first level of one-two power divider, the second level of one-two power dividers, the third level of one-two power dividers and the fourth level of one-two power dividers are cascade connected to obtain a one-sixteen power divider. In the one-sixteen power divider according to the embodiment of the present disclosure, a one-two power divider is provided in the first level, two one-two power dividers are provided in the second level, four one-two power dividers are provided in the third level and eight one-two power dividers are provided in the fourth level. The length of one-two power dividers in each level of the conventional Wilkinson power divider is one-quarter wavelength, while the length of the one-two power dividers in each level of the power divider according to the embodiment of the present disclosure is merely one third of the former. The total area of the power divider is 1.3 mm*1.3 mm, which greatly reduces the area cost of the chip compared with the conventional power divider.

In addition, the length of the one-sixteen power divider is shortened, and loss due to parasitism of the microstrip signal line is also reduced, such that the transmission loss of the power divider according to the embodiment of the present disclosure is reduced.

Figure 7:
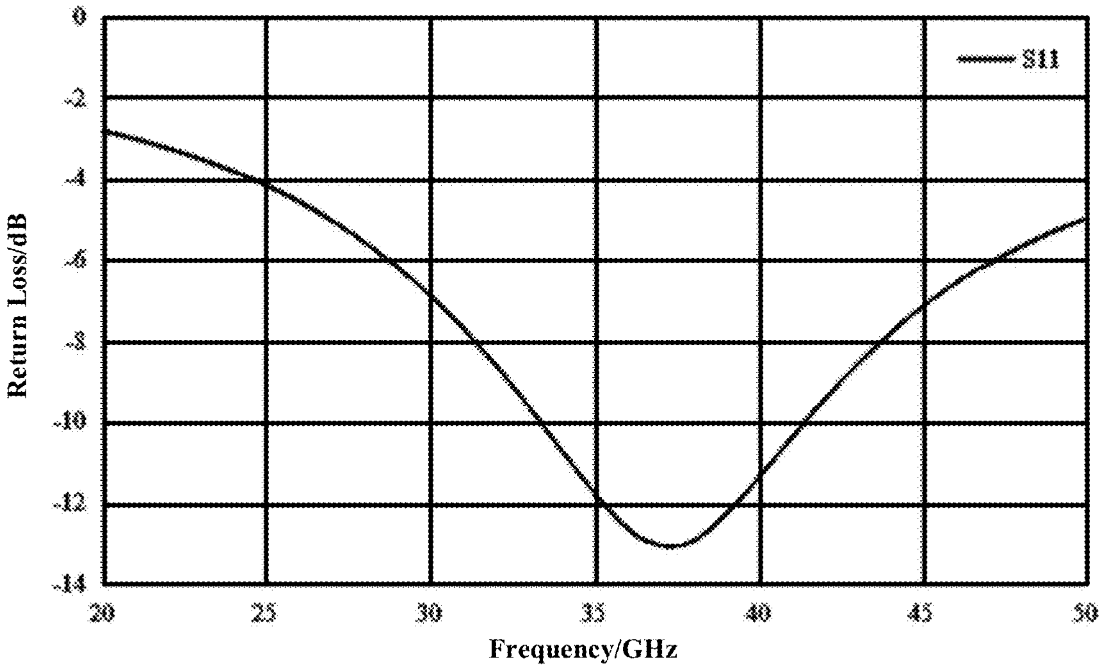
FIG. 7 is a curve of return loss vs. frequency from an input port to sixteen output ports of a one-sixteen power divider according to an embodiment of the present disclosure.

In the frequency band of 37 GHz to 40 GHz, the loss of the one-sixteen power divider is less than 1 dB, the isolation between the output ports is less than −20 dB, and the return loss of the input port S11 is less than −10 dB. A graph of the return loss (dB) vs. frequency (GHz) of the one-sixteen power divider is shown in FIG. 7.

In conclusion, the one-sixteen power divider is configured based on the method for configuring a one-$2^N$ power divider provided in the embodiment of the present disclosure, and has improved performance indexes and an area reduced to about one third of that of the traditional Wilkinson power divider, which greatly saves the cost for circuit design and is suitable for popularization in the circuit design.

In the description of the above embodiments, the method according to the above embodiments may be implemented by software and a necessary general hardware platform, or may be implemented by hardware. The technical solutions of the present disclosure may essentially be embodied in the form of a software product stored in a storage medium (e.g., Read-Only Memory, Random Access Memory, magnetic disk, optical disk) including instructions for causing a terminal device (which may be a mobile phone, a computer, a server, a network device, or the like) to implement the method according to the embodiments of the present disclosure.

Embodiments of the present disclosure further provide a computer-readable storage medium which stores a computer program, when executed by a processor, causing the processor to implement the method according to any one of the embodiments described above.

In an embodiment, the computer-readable storage medium may be configured to store a computer program, when executed by a processor, causing the processor to implement steps as follows.

Step 1, input impedance of a power division unit in a Kth level is regulated so that the input impedance of the Kth level of power division units conjugate-matches output impedance of a unit connected to an input port of the power division unit in the Kth level.

Step 2, output impedance of the power division unit in the Kth level is regulated so that the output impedance of the power division unit in the Kth level conjugate-matches load impedance of the power division unit in the Kth level. Herein the power divider includes M power division units, the M power division units are cascade connected to form a cascade structure of N levels, and each of the power division units includes one input port and two output ports, where N, K, and M are positive integers greater than or equal to 1.

According to the aforementioned steps, since the input impedance of power division units in each level conjugate-matches the output impedance of the unit connected to the input port of power division units in the respective level, and the output impedance of power division units in each level conjugate-matches the load impedance of power division units in the respective level. In this way, the inter-level impedance of the power divider is no longer fixed impedance value, and may be specified complex impedance, such that a length of power division units in each level is shortened, the problem of a larger area of the power divider due to a longer length of a signal line of the power divider is solved, an overall area of the power divider is reduced, and the loss of the power divider is reduced.

In an embodiment, the storage medium may include, but is not limited to, a USB flash drive, a ROM, a RAM, a mobile hard disk drive, a magnetic disk, an optical disk, or other medium capable of storing a computer program.

Embodiments of the present disclosure further provide an electronic device including a memory storing a computer program and a processor configured to execute the computer program to implement the method according to any one of the embodiments described above.

In an embodiment, the electronic device may further include a transmission device and an input and output device. Both the transmission device and the input and output device are connected to the processor.

In an embodiment, the processor may be configured to execute the computer program to implement steps as follows.

Step 1, input impedance of a power division unit in a Kth level is regulated so that the input impedance of the power division unit in the Kth level conjugate-matches output impedance of a unit connected to an input port of the power division unit in the Kth level.

Step 2, output impedance of the power division unit in the Kth level is regulated so that the output impedance of the power division unit in the Kth level conjugate-matches load impedance of the power division unit in the Kth level. Herein the power divider includes M power division units, the M power division units are cascade connected to form a cascade structure of N levels, and each of the power division units includes one input port and two output ports, where N, K, and M are positive integers greater than or equal to 1.

According to the aforementioned steps, since the input impedance of power division units in each level conjugate-matches the output impedance of the unit connected to the input port of power division units in the respective level, and the output impedance of power division units in each level conjugate-matches the load impedance of power division units in the respective level. In this way, the inter-level impedance of the power divider is no longer a fixed impedance value, and may be a specified complex impedance, such that a length of power division units in each level is shortened, the problem of a larger area of the power divider due to a longer length of a signal line of the power divider is solved, an overall area of the power divider is reduced, and the loss of the power divider is reduced.

For specific examples in this embodiment, reference may be made to the examples described in the above embodiments which will not be repeated herein.

The modules or steps of the present disclosure described above may be implemented with a general purpose computing device, and may be centralized on a single computing device, or distributed over a network of multiple computing devices, optionally, may be implemented by program code executable by the computing device such that they may be stored in a storage device for execution by the computing device, and in some cases, the steps shown or described may be performed in a different order than described herein, or they may be fabricated separately as a plurality of integrated circuit modules, or multiple modules or steps among them may be fabricated as a single integrated circuit module. As such, the present disclosure is not limited to any particular combination of hardware and software.

What is claimed is:

1. A power divider, comprising:

M power division units, wherein the M power division units are cascade connected to form a cascade structure of N levels, wherein each of the power division units comprises one input port and two output ports, and each power division unit in a Kth level in the cascade structure satisfies relationships in which:

input impedance of the power division unit in the Kth level conjugate-matches output impedance of a unit connected to an input port of the power division unit in the Kth level, and output impedance of the power division unit in the Kth level conjugate-matches load impedance of the power division unit in the Kth level, where N, K, and M are positive integers greater than or equal to 1;

M impedance isolation units, each of the M impedance isolation units connected between the two output ports of corresponding power division unit, wherein each of the M impedance isolation units is configured to regulate output impedance of the corresponding power division unit so that the output impedance of the corresponding power division unit conjugate-matches load impedance of the corresponding power division unit.

2. The power divider according to claim 1, wherein in a case where N, M, and K are equal to 1, input impedance of a power division unit in a first level conjugate-matches target source impedance of the power divider, and output impedance of the power division unit in the first level conjugate-matches target load impedance of the power divider, and the target source impedance and the target load impedance of the power divider are pre-determined;

or, in a case where M is greater than or equal to 3, N is greater than or equal to 2, and K is equal to 1, the input impedance of the power division unit in the first level conjugate-matches the target source impedance of the power divider, and the output impedance of the power division unit in the first level conjugate-matches load impedance of the power division unit in the first level; and in a case where M is greater than or equal to 3, N is greater than or equal to 2, and K is greater than or equal to 2 and less than N, the input impedance of the power division unit in the Kth level conjugate-matches output impedance of a power division unit in a (K−1)th level, and the output impedance of the power division unit in the Kth level conjugate-matches the load impedance of the power division unit in the Kth level, where K is a positive integer in a range of 2 to N−1; and in a case where M is greater than or equal to 3, N is greater than or equal to 2, and K is equal to N, the input impedance of the power division unit in the Kth level conjugate-matches the output impedance of the power division unit in the (K−1)th level, and the output impedance of the power division unit in the Kth level conjugate-matches the target load impedance of the power divider.

3. The power divider according to claim 1, wherein in a case where M is greater than or equal to 3 and N is greater than or equal to 2, input impedance corresponding to all or some of intermediate ports in the power divider are not equal to target source impedance of the power divider; or output impedance corresponding to all or some of intermediate ports in the power divider are not equal to target load impedance of the power divider; or the input impedance corresponding to some of intermediate ports in the power divider are not equal to target source impedance of the power divider and the output impedance corresponding to some of intermediate ports in the power divider are not equal to target load impedance of the power divider; and wherein the intermediate ports comprises at least one of input ports and output ports of the power division units between a power divider input port and a power divider output port.

4. The power divider according to claim 1, wherein each impedance isolation unit comprises a resistor and a capacitor connected in parallel.

5. A regulation method, applicable to a power divider, comprising:

regulating input impedance of a power division unit in a Kth level so that the input impedance of the power division unit in the Kth level conjugate-matches output impedance of a unit connected to an input port of the power division unit in the Kth level; and regulating output impedance of the power division unit in the Kth level so that the output impedance of the power division unit in the Kth level conjugate-matches load impedance of the power division unit in the Kth level;

wherein the power divider comprises M power division units including the power division unit in the Kth level, the M power division units are cascade connected to form a cascade structure of N levels including the Kth level, each of the M power division units comprises one input port and two output ports, and N, K, and M are positive integers greater than or equal to 1;

wherein the output impedance of the power division unit in the Kth level is regulated by regulating the output impedance of the power division unit including the Kth level by an impedance isolation unit including the Kth level connected between the two output ports of the power division unit including the Kth level.

6. The regulation method according to claim 5, wherein in a case where M is greater than or equal to 3 and N is greater than or equal to 2, after regulation, input impedance corresponding to all or some of intermediate ports in the power divider are not equal to target source impedance of the power divider; or output impedance corresponding to all or some of intermediate ports in the power divider are not equal to target load impedance of the power divider; or the input impedance corresponding to some of intermediate ports in the power divider are not equal to target source impedance of the power divider and the output impedance corresponding to some of intermediate ports in the power divider are not equal to target load impedance of the power divider; and wherein the intermediate ports comprises at least one of input ports and output ports of the power division units between a power divider input port and a power divider output port.

7. The regulation method according to claim 5, wherein the regulating input impedance of a power division unit in the Kth level so that the input impedance of the power division unit in the Kth level conjugate-matches output impedance of a unit connected to an input port of the power division unit in the Kth level and the regulating output impedance of the power division unit in the Kth level so that the output impedance of the power division unit in the Kth level conjugate-matches load impedance of the power division unit in the Kth level comprise:

in a case where N, M, and K are equal to 1, regulating input impedance of a power division unit in a first level to conjugate-match target source impedance of the power divider, and regulating output impedance of the power division unit in the first level to conjugate-match target load impedance of the power divider, wherein the target source impedance and the target load impedance of the power divider are pre-determined;

or, in a case where M is greater than or equal to 3, N is greater than or equal to 2, and K is equal to 1, regulating the input impedance of the power division unit in the first level to conjugate-match the target source impedance of the power divider, and regulating the output impedance of the power division unit in the first level to conjugate-match load impedance of the power division unit in the first level; and in a case where M is greater than or equal to 3, N is greater than or equal to 2, and K is greater than or equal to 2 and less than N, regulating the input impedance of the power division unit in the Kth level to conjugate-match output impedance of a power division unit in a (K−1)th level, and regulating the output impedance of the power division unit in the Kth level to conjugate-match the load impedance of the power division unit in the Kth level, wherein K is a positive integer in a range of 2 to N−1; and in a case where M is greater than or equal to 3, N is greater than or equal to 2, and K is equal to N, regulating the input impedance of the power division unit in the Kth level to conjugate-match the output impedance of the power division unit in the (K−1)th level, and regulating the output impedance of the power division unit in the Kth level to conjugate-match the target load impedance of the power divider.

8. The regulation method according to claim 5, wherein the output impedance of the power division unit in the Kth level is further regulated by regulating at least one of characteristic impedance and a length of microstrip line of the power division unit.

* * * * *